US007021200B2

(12) United States Patent
Han et al.

(10) Patent No.: US 7,021,200 B2
(45) Date of Patent: Apr. 4, 2006

(54) COOKING APPARATUS

(75) Inventors: Dae-Sung Han, Hwasung (KR); Chul Kim, Yongin (KR); Yong-Woon Han, Kunpo (KR); Seong-Deog Jang, Suwon (KR); Kyung-Hee Hahm, Seoul (KR); Joo-Yeong Yeo, Hwasung (KR); Han-Seong Kang, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 79 days.

(21) Appl. No.: 10/681,132

(22) Filed: Oct. 9, 2003

(65) Prior Publication Data

US 2004/0089161 A1 May 13, 2004

(30) Foreign Application Priority Data

Nov. 9, 2002 (KR) ..................... 10-2002-0069444
Feb. 6, 2003 (KR) ..................... 10-2003-0007563

(51) Int. Cl.
*A47J 37/06* (2006.01)

(52) U.S. Cl. ........................... 99/400; 99/401; 99/446; 99/447

(58) Field of Classification Search .................. 99/400, 99/401, 446, 447
See application file for complete search history.

(56) References Cited

U.S. PATENT DOCUMENTS 3,152,242 A 10/1964 De Mott
3,154,004 A 10/1964 Huck
3,371,659 A 3/1968 Paspalas
4,508,024 A 4/1985 Perkins
4,893,609 A 1/1990 Giordani et al.
5,176,067 A * 1/1993 Higgins ....................... 99/340
5,189,945 A 3/1993 Hennick
5,191,831 A * 3/1993 Walden ....................... 99/446
5,368,009 A * 11/1994 Jones ....................... 126/41 R
5,535,733 A 7/1996 Hait
5,862,741 A * 1/1999 Wodeslavsky ............... 99/340
6,125,838 A 10/2000 Hedgpeth (Continued)

FOREIGN PATENT DOCUMENTS

FR 2 670 274 6/1992

(Continued)

OTHER PUBLICATIONS

Patent Abstract of Korea Publication No. 2002-16089, dated Mar. 4, 2002.

(Continued)

*Primary Examiner*—Reginald L. Alexander
(74) *Attorney, Agent, or Firm*—Staas & Halsey LLP

(57) ABSTRACT

A cooking apparatus having a body, one or more heating units, a grill unit, and a heat reflecting unit. The heating units are arranged between the grill unit and the heat reflecting unit. The heat reflecting unit has front and rear plates, side plates, and a pair of inner reflecting plates and a pair of outer reflecting plates. The inner reflecting plates are upwardly projected to be higher than the outer reflecting plates. The front plate includes an upper surface and inner and outer surfaces, and is provided in the upper surface thereof with a water inlet, and in the inner surface thereof with an overflow hole. The front plate has a water level window to ascertain a level of water. The front plate is positioned outside the body so that oil and sauce are prevented from entering the inner space of the heat reflecting unit through the water inlet.

19 Claims, 4 Drawing Sheets

U.S. PATENT DOCUMENTS

| | | | |
|---|---|---|---|
| 6,293,276 | B1 | 9/2001 | Owens et al. |

FOREIGN PATENT DOCUMENTS

| | | | |
|---|---|---|---|
| FR | 2 724 833 | | 3/1996 |
| GB | 2 286 111 | | 8/1995 |
| JP | 3026216 | * | 2/1991 |

OTHER PUBLICATIONS

Patent Abstract of Japan Publication No. 2001-120440 dated May 8, 2001.

Patent Abstract of Japan Publication No. 2000-254007 dated Sep. 19, 2000.

Patent Abstract of Japan Publication No. 2000-166771 dated Jun. 20, 2000.

Patent Abstract of Japan Publication No. 03-026216 dated Feb. 4, 1991.

Patent Abstracts of Japan for Japanese Publication No. 11-267032, published Oct. 5, 1999.

* cited by examiner

COOKING APPARATUS

CROSS-REFERENCE TO RELATED APPLICATIONS

This application claims the benefit of Korean Patent Application No. 2002-69444 filed on Nov. 9, 2002 and Korean Patent Application No. 2003-7563 filed on Feb. 6, 2003 in the Korean Intellectual Property Office, the disclosures of which are incorporated herein by reference.

BACKGROUND OF THE INVENTION

1. Field of the Invention

The present invention relates generally to a cooking apparatus, and more particularly, to a cooking apparatus that is capable of effectively transferring heat to food to be cooked, thereby improving an energy efficiency of the cooking apparatus and reducing cooking time.

2. Description of the Related Art

Generally, meat, such as beef and pork, and processed meat, such as sausage and ham, are most delicious when grilled, in which food is cooked by directly applying heat to the food while putting the food on a grill. Accordingly, people are fond of having meat and processed meat grilled.

In general, a cooking apparatus that grills food includes a heating unit that applies heat to food, and a grill unit on which the food is put to be partially exposed to the heating unit. The cooking apparatus functions to cook the food by transferring heat generated by the heating unit to food put on the grill unit.

To grill meat such as beef, pork, and mutton, the meat is cut into slices having an appropriate size, and is put on the grill unit, and sauce made of various condiments is applied thereto. When slices of meat mixed with sauce are heated by heat transferred from the heating unit, oil contained in the slices of meat and sauce applied to the meat drop downward.

Consequently, an oil collecting unit is provided in a body of the cooking apparatus to collect heated oil and sauce that drop downward from the slices of meat. The oil collecting unit is disposed under the grill unit, and the heating unit is disposed between the grill unit and the oil collecting unit.

But the conventional cooking apparatus constructed as described above cooks food using only heat transferred upward from the heating unit, because the heating unit is disposed just under the grill unit. Accordingly, the conventional cooking apparatus cannot effectively transfer heat to the food, so the conventional cooking apparatus has a low energy efficiency, and requires a lengthy cooking time.

Additionally, the conventional cooking apparatus is disadvantageous in that the grill unit is maintained at high temperature by the heat received from the heating unit, so portions of food in contact with the heated grill unit burn, thus deteriorating the taste of the food and potentially doing harm to users' health.

SUMMARY OF THE INVENTION

Accordingly, it is an aspect of the present invention to provide a cooking apparatus, which is capable of allowing heat generated by a heating unit to be effectively transferred to food.

It is another aspect of the present invention to provide a cooking apparatus, which is capable of preventing oil and sauce from being burned by the heat of a heating unit after the oil and sauce drop from cooking food onto a heat reflecting unit.

Additional aspects and advantages of the invention will be set forth in part in the description which follows and, in part, will be obvious from the description, or may be learned by practice of the invention.

The foregoing and/or other aspects of the present invention are achieved by providing a cooking apparatus, which has a body provided in a top thereof with an opening, at least one heating unit arranged in the body, a grill unit mounted on the top of the body, and a heat reflecting unit arranged below the grill unit to face the heating unit, wherein the heat reflecting unit has an inner space that contains water, a water inlet through which the water is fed into the inner space, a water level maintaining unit that maintains the water below a predetermined water level in the inner space, and a water vapor discharging space positioned in an upper portion of the inner space.

According to one aspect, the heat reflecting unit has a bottom plate, front and rear plates, side plates, and a pair of inner reflecting plates and a pair of outer reflecting plates positioned within the front, rear, bottom, and side plates, the inner reflecting plates are positioned in contact with each other at upper ends thereof and the upper ends of the inner reflecting plates are farther from the bottom plate than the upper ends of the outer reflecting plates which are spaced apart from each other, and the front plate includes an upper surface, and inner and outer surfaces, and the front plate is provided in the upper surface thereof with a water inlet, and in the inner surface thereof, at a predetermined distance from the bottom plate, the front plate is provided with the water level maintaining unit, that has at least one overflow hole.

According to one aspect, the overflow hole is positioned at a distance from the bottom plate substantially equal to that of the upper ends of the outer reflecting plates, so that the water contained in the inner space of the heat reflecting unit is maintained at a level corresponding to that of the upper ends of the outer reflecting plates.

According to one aspect, the outer surface of front plate of the heat reflecting unit comprises a water level window, to ascertain the water level of the inner space of the heat reflecting unit.

According to one aspect, the bottom plate is convex, so that the inner space of the heat reflecting unit is filled with a predetermined amount of water.

According to one aspect, the front plate of the heat reflecting unit is positioned outside the body when the heat reflecting unit is inserted into the body, so that oil and sauce separated from food are prevented from entering the inner space of the heat reflecting unit through the water inlet.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF THE PREFERRED EMBODIMENTS

Figure 1:
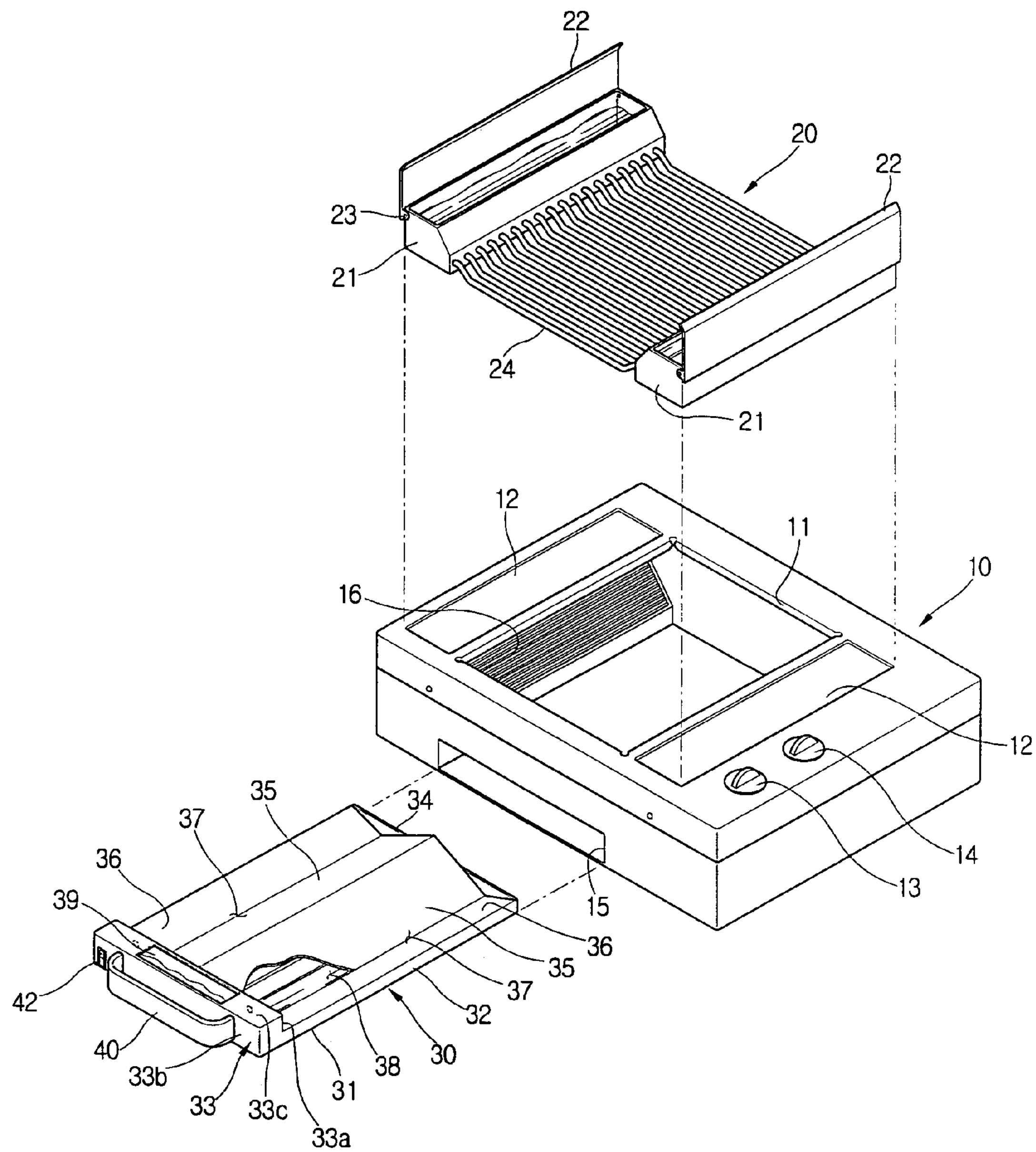
FIG. 1 is an exploded perspective view of a cooking apparatus, according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
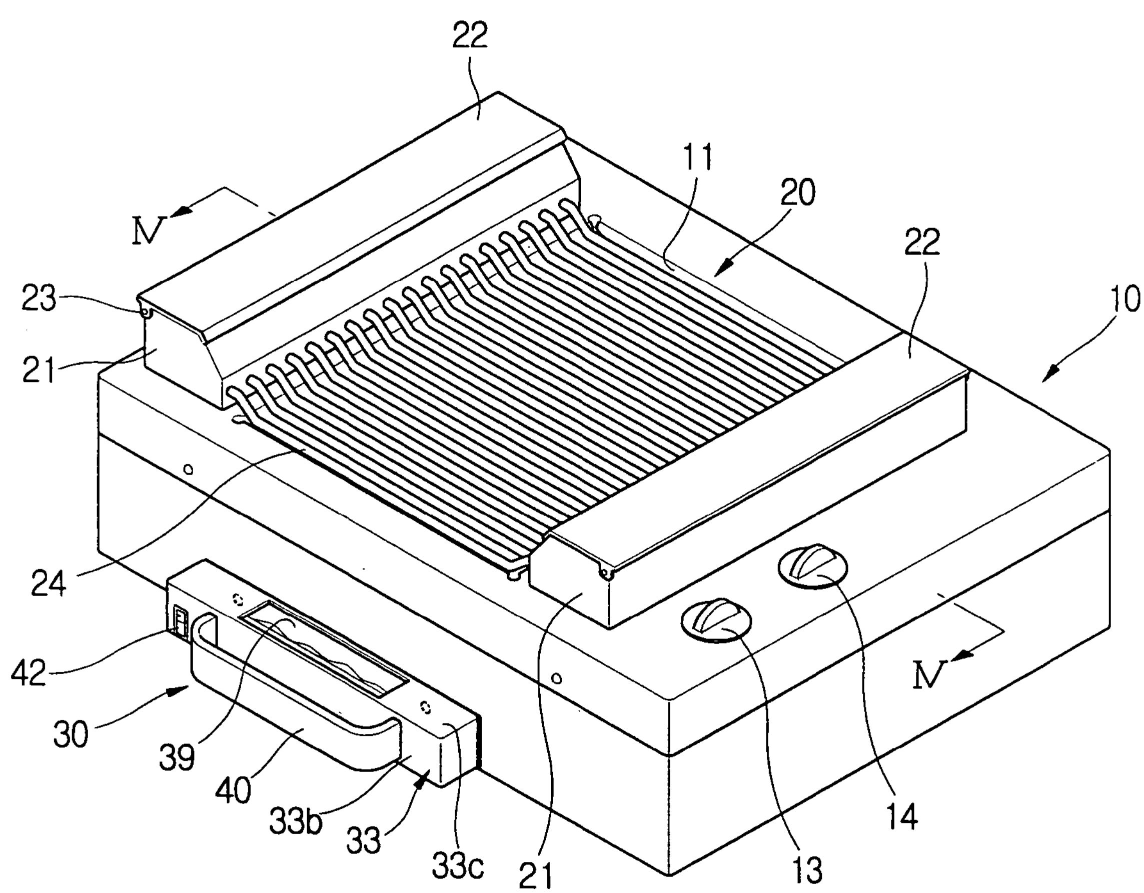
FIG. 2 is a perspective view of the cooking apparatus of FIG. 1.
Figure 3:
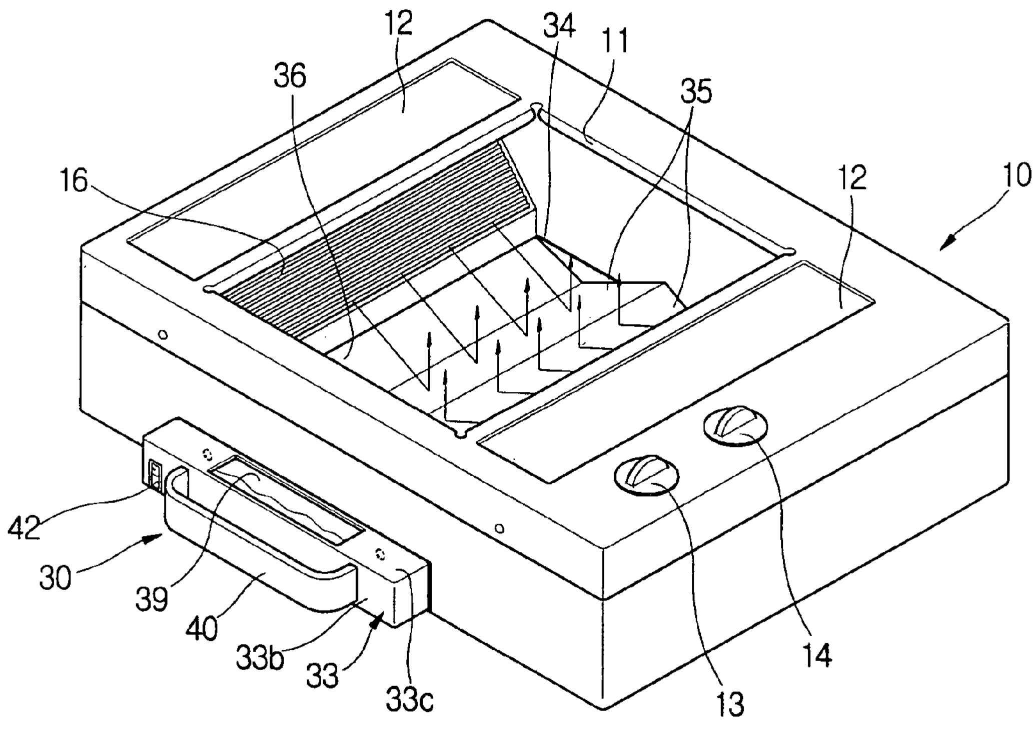
FIG. 3 is a perspective view of the cooking apparatus of FIG. 1 with a grill unit removed from a body, illustrating operation of a heat reflecting unit.
Figure 4:
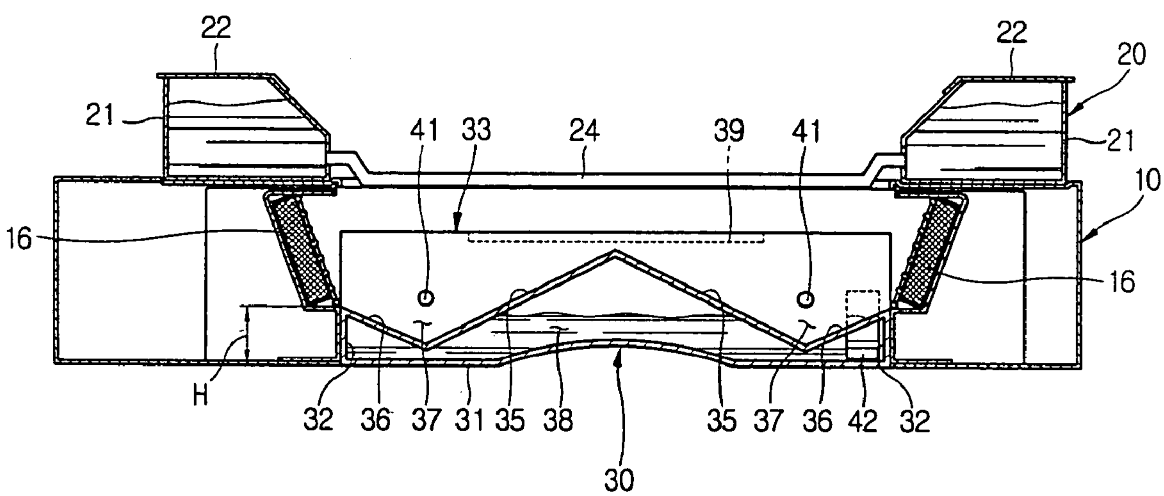
FIG. 4 is a sectional view of the cooking apparatus of FIG. 1, taken along line IV—IV of FIG. 2, illustrating a structure of the heat reflecting unit.

FIG. 1 is an exploded perspective view of a cooking apparatus, according to an embodiment of the present invention. FIG. 2 is a perspective view of the cooking apparatus of FIG. 1. FIG. 3 is a perspective view of the cooking apparatus of FIG. 1 with a grill unit removed from a body illustrating operation of a heat reflecting unit. FIG. 4 is a sectional view of the cooking apparatus of FIG. 1, taken along line IV—IV of FIG. 2, illustrating a structure of the heat reflecting unit.

The cooking apparatus has a body 10 constructed roughly in a box form, a plurality of heating units 16 disposed in the body 10 to apply heat to food, a grill unit 20 seated on a top of the body 10 to put food thereon, and a heat reflecting and oil collecting unit 30 positioned in a lower portion of the body 10 to transfer radiant heat to the grill unit 20, and simultaneously receive and collect oil generated from food put on the grill unit 20. That is, the heat reflecting and oil collecting unit 30 is constructed by integrating a heat reflecting structure with an oil collecting structure. Additionally, the heat reflecting and oil collecting unit 30 cools a heat reflecting plate, which will be described later, to prevent dropped oil from burning. Hereinafter, the heat reflecting and oil collecting unit 30 will be referred to as the "heat reflecting unit 30" for ease of description.

An opening 11 is provided in the top of the body 10 to allow heat generated from the heating units 16 to be transferred to the grill unit 20, and concave seat portions 12 are positioned on first and second sides of the opening 11 to stably seat the grill unit 20 thereon. A timer switch 13 and a power switch 14 are positioned on a portion of the top of the body 10 to adjust the heating time and temperature of the heating units 16. Further, a slot 15 is positioned in the lower end portion of the body 10 to insert and remove the heat reflecting unit 30 therethrough.

The heating units 16 are a pair of heating units 16 arranged on first and second sides of an interior of the body 10, and are inclined toward the opening 11. According to one aspect, the heating units 16 are ceramic bodies with electrothermal wires encapsulated therein to produce high-temperature far infrared rays. According to another aspect, the heating units 16 are gas heaters that generate heat by burning gas. According to yet another aspect, the heating units 16 are charcoal heaters that generate heat by burning charcoal.

The grill unit 20 has: a pair of water tanks 21 that are spaced apart from each other and seated on the seat portions 12, respectively; and a plurality of grill pipes 24 that are each connected at both ends thereof to the respective water tanks 21, and are filled with water.

A lid 22 is mounted on an open top of each of the water tanks 21 to selectively open and close the open top of the water tank 21 through the use of a hinge 23. Accordingly, the water tank 21 is filled with water while the lid 22 is opened, and the grill pipes 24 are filled with water, so that the portions of food in contact with the grill pipes 24 do not burn. Then, the lid 22 is closed.

The heat reflecting unit 30 includes: a bottom plate 31 with a rectangular shape; two side plates 32 upwardly extending from side edges of the bottom plate 31; front and rear plates 33 and 34 upwardly extending from front and rear edges of the bottom plate 31, respectively; and a pair of inner reflecting plates 35 and a pair of outer reflecting plates 36, arranged within the side, front, and rear plates 32, 33, and 34, above the bottom plate 31.

The inner and outer reflecting plates 35 and 36 roughly approximate a W shape, and receive radiant heat transferred from the heating units 16, and reflect the radiant heat toward the grill pipes 24. The inner reflecting plates 35 are arranged side by side with upper ends thereof contacting each other. The outer reflecting plates 36 are spaced apart from each other with upper ends thereof connected to the side plates 32, and lower ends thereof connected to lower ends of the inner reflecting plates 35.

Accordingly, a recess 37 is positioned at each of the intersections of the inner reflecting plates 35 and the outer reflecting plates 36, so that oil dropping from food onto the inner and outer reflecting plates 35 and 36 collects within the recess 37.

Further, the inner and outer reflecting plates 35 and 36 are connected to the side plates 32 and the front and rear plates 33 and 34, such that an inner space 38 is defined in between the side plates 32 and the front and rear plates 33 and 34 by the inner and outer reflecting plates 35 and 36, and the bottom plate 31.

The inner reflecting plates 35 are connected at upper ends thereof near the grill unit 20, and are higher than lower ends of the heating units 16, so that heat generated by the heating units 16 is effectively reflected to the grill unit 20.

The front plate 33 includes an inner surface 33*a*, an outer surface 33*b*, and an upper surface 33*c*. In a top of the front plate 33, there is a water inlet 39. When water is fed into the water inlet 39, the inner space 38 of the heat reflecting unit 30 is filled with the water. Accordingly, even though heat generated by the heating units 16 is transferred to the heat reflecting unit 30, oil and sauce collected within the recesses 37 and adhering to the inner and outer reflecting plates 35 and 36 are prevented from burning.

When the heat reflecting unit 30 is inserted into the body 10 through the slot 15, the front plate 33 of the heat reflecting unit 30 is positioned outside the body 10, so that oil and sauce separated from food are prevented from entering the inner space 38 of the heat reflecting unit 30 through the water inlet 39.

A pair of overflow holes 41 (see FIG. 4) are positioned on the front surface 33*a* of the front plate 33, to fill the inner space 38 with water to a certain level. The overflow holes 41 are positioned at a height substantially equal to a height H (see FIG. 4) of upper ends of the outer reflection plates 36. That is, water filling the inner space 38 of the heat reflecting unit 30 is maintained at the height of the upper ends of the outer reflecting plates 36. Therefore, even though a large amount of heat is transferred to the outer portions of the outer reflecting plates 36 near the heating units 16, the outer reflecting plates 36 are maintained below a predetermined temperature by the water in the inner space 38.

The overflow holes 41 are arranged above the recesses 37, so that excess water flows into the recesses 37 through the overflow holes 41 when water fed through the water inlet 39 reaches the height of the overflow holes 41.

To prevent water from being excessively fed to the inner space, a water level window 42 made of transparent material is positioned on the outer surface 33*b* of the front plate 33. The water level window 42 has a height ranging from a lower end of the outer surface 33*b* to a position somewhat higher than the height of the overflow holes 41. A graduation is formed at a height corresponding to the height of the overflow holes 41. Thus water does not overflow through the overflow holes 41 when water is fed to a water level equal to or below the graduation.

As shown in FIG. 4, the bottom plate 31 of the heat reflecting unit 30 is convex, so that the inner space 38 of the heat reflecting unit 30 is filled with an appropriate amount of water. The convex bottom plate 31 prevents the temperature of the heat reflecting unit 30 from being excessively lowered, and minimizes use of water.

A grip 40 is positioned on the front surface 33*b* of the front plate 33, so that the heat reflecting unit 30 is slidably inserted into or removed from an interior of the body 10 when a user selectively pushes and pulls the heat reflecting unit 30 through the slot 15 of the body 10.

Water is filled into the inner space 38 of the heat reflecting unit 30 through the water inlet 39 while a water level is checked through the water level window 42 so that the water level does not exceed the water level of the graduation. And water is filled into the water tanks 21 to fill the grill pipes 24 with water. In this state, when power is applied, heat is transferred to the grill pipes 24.

When meat is put on the grill pipes 24, part of heat generated by the heating units 16 is directly transferred to the grill pipes 24 of the grill unit 20 and part of the heat is reflected to the grill pipes 24 by the inner and outer reflecting plates 35 and 36, thus grilling the food.

The interiors of the grill pipes 24 are filled with water, thus cooling the grill pipes 24 so that portions of food in contact with the grill pipes 24 are prevented from burning and adhering to the grill pipes 24, even though the grill pipes 24 receive heat from the heating units 16.

Meanwhile, the oil and sauce that drop downward during cooking, flow along the inner and outer reflecting plates 35 and 36, and are collected within the recesses 37.

In this case, even though oil and sauce drop onto the inner and outer reflecting plates 35 and 36, oil and sauce collected within the recesses 37 and adhering to the inner and outer reflecting plates 35 and 36 are prevented from burning, because the interior of the heat reflecting unit 30 is also filled with water. Accordingly, cleaning of the heat reflecting unit 30 performed after cooking is easily carried out.

Further, water vapor formed when water is evaporated by heat transferred from the heating unit 16 rises to an upper portion of an interior formed by the inner reflecting plates 35 and is discharged from the heat reflecting unit 30 through the overflow holes 41 and the water inlet 39, so the inner space 38 of the heat reflecting unit 30 is prevented from being overheated.

As described above in detail, the cooking apparatus directly transfers heat generated by the heating units to the grill unit and reflects heat to the grill unit through the use of the heat reflecting unit, so the energy efficiency of the cooking apparatus is increased and the cooking time is shortened.

In addition, the cooking apparatus is constructed so that the interiors of the grill pipes are filled with water. Accordingly, the portions of food in contact with the grill pipes are prevented from adhering to the grill pipes, so the food is cooked properly and burning is prevented. Thus, smoke is not produced by the cooking apparatus, resulting in cleaner and healthier air.

In addition, the cooking apparatus of the present invention allows the interior of the heat reflecting unit to be filled with water at an appropriate water level, so the heat reflecting unit reflects heat under an optimum condition and oil and sauce dropping onto the heat reflecting unit are prevented from burning, thus facilitating cleaning of the cooking apparatus.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A cooking apparatus, comprising:

a body provided in a top thereof with an opening;

at least one heating unit arranged in the body;

a grill unit mounted on the top of the body; and a heat reflecting unit arranged below the grill unit to face the heating unit, wherein the heat reflecting unit has an upper surface with at least one trough to collect liquid and particulate separated from food during cooking, an inner space beneath the upper surface to contain water, a water inlet through which the water is fed into the inner space, a water level maintaining unit that maintains the water below a predetermined water level in the inner space, and a water vapor discharging space positioned in an upper portion of the inner space.

2. A cooking apparatus, comprising:

a body provided in a top thereof with an opening;

at least one heating unit arranged in the body;

a grill unit mounted on the top of the body; and a heat reflecting unit arranged below the grill unit to face the heating unit, wherein the heat reflecting unit has an inner space to contain water, a water inlet through which the water is fed into the inner space, a water level maintaining unit that maintains the water below a predetermined water level in the inner space, and a water vapor discharging space positioned in an upper portion of the inner space, wherein:

the heat reflecting unit comprises a bottom plate, front and rear plates, side plates, and a pair of inner reflecting plates and a pair of outer reflecting plates positioned within the front, rear, bottom, and side plates, the inner reflecting plates are positioned in contact with each other at upper ends thereof, and the upper ends of the inner reflecting plates are farther from the bottom plate than the upper ends of the outer reflecting plates which are spaced apart from each other, and the front plate comprises an upper surface, and inner and outer surfaces, and the front plate is provided in the upper surface thereof with a water inlet, and in the inner surface thereof, at a predetermined distance from the bottom plate, the front plate is provided with the water level maintaining unit, that has at least one overflow hole.

3. The cooking apparatus as set forth in claim 2, wherein:

the overflow hole is positioned at a distance from the bottom plate substantially equal to that of the upper ends of the outer reflecting plates so that the water contained in the inner space of the heat reflecting unit is maintained at a level corresponding to that of the upper ends of the outer reflecting plates.

4. The cooking apparatus as set forth in claim 2, wherein the outer surface of the front plate of the heat reflecting unit comprises:

a water level window, to ascertain the water level of the inner space of the heat reflecting unit.

5. The cooking apparatus as set forth in claim 2, wherein: the bottom plate is convex in relation to the inner space of the heat reflecting unit, to reduce a volume of the inner space.

6. The cooking apparatus as set forth in claim 2, wherein: the front plate of the heat reflecting unit is positioned outside the body when the heat reflecting unit is inserted into the body, so that oil and sauce separated from food are prevented from entering the inner space of the heat reflecting unit through the water inlet.

7. A cooking apparatus, comprising:

a body;

a cooking surface;

at least one heating unit; and a heat reflecting unit, removably mounted in the body to reflect heat from the heating unit toward the cooking surface, and collect liquid and particulate separated from food during cooking, the heat reflecting unit comprising:

a frame, and a collecting and reflecting structure attached to the frame to reflect heat from the heating unit toward the cooking surface, and collect the liquid and particulate separated from the food during cooking, wherein the collecting and reflecting structure comprises:

inner reflecting plates, non-coplanarly joined at first edges thereof, and outer reflecting plates, each non-coplanarly joined to a second edge of one of the inner reflecting plates.

8. The cooking apparatus according to claim 7, wherein the collecting and reflecting structure further comprises:

at least one recess defined where at least one of the inner reflecting plates joins the corresponding outer reflecting plate, to collect the liquid separated from the food during cooking.

9. A cooking apparatus, comprising:

a body;

a cooking surface;

at least one heating unit; and a heat reflecting unit, removably mounted in the body to reflect heat from the heating unit toward the cooking surface, and collect liquid and particulate separated from food during cooking, the heat reflecting unit comprising:

a frame, and a collecting and reflecting structure attached to the frame to reflect heat from the heating unit toward the cooking surface, and collect the liquid and particulate separated from the food during cooking, wherein the frame and the collecting and reflecting structure define a cavity therebetween, in which a cooling fluid is housed to cool the collecting and reflecting structure.

10. The cooking apparatus according to claim 9, wherein the frame comprises:

a fluid inlet in communication with the cavity, to introduce the cooling fluid to the cavity.

11. The cooking apparatus according to claim 10, wherein the frame further comprises:

an outer member that remains outside the body when the heat reflecting unit is mounted in the body, wherein the fluid inlet is located on the outer body to prevent the liquid and particulate separated from the food during cooking from entering the cavity through the fluid inlet.

12. The cooking apparatus according to claim 11, wherein the frame further comprises:

an overflow hole in communication with the cavity, to prevent a volume of cooling fluid in the cavity from exceeding a predetermined volume.

13. The cooking apparatus according to claim 12, wherein the collecting and reflecting structure comprises:

inner reflecting plates, non-coplanarly joined at first edges thereof; and outer reflecting plates, each non-coplanarly joined to a second edge of one of the inner reflecting plates, wherein at least one recess is defined where at least one of the inner reflecting plates joins the corresponding outer reflecting plate, to collect the liquid separated from the food during cooking, and the overflow hole is positioned such that excess cooling fluid drains into the recess.

14. The cooking apparatus according to claim 12, wherein:

the collecting and reflecting structure comprises inner reflecting plates, non-coplanarly joined at first edges thereof, and outer reflecting plates, each non-coplanarly joined to a second edge of one of the inner reflecting plates;

the at least one heating unit is positioned adjacent to at least one of the outer reflecting plates; and the overflow hole is positioned such that the when the volume of cooling fluid equals the predetermined volume, the cooling fluid cools a portion of the at least one of the outer reflecting plates adjacent to the at least one heating unit.

15. The cooking apparatus according to claim 12, wherein the outer member comprises:

a cooling fluid level window made of transparent material, to ascertain a level of cooling fluid in the cavity.

16. The cooking apparatus according to claim 15, wherein the cooling fluid level window has a graduation corresponding to the position of the overflow hole.

17. The cooking apparatus according to claim 11, wherein the outer member comprises:

a grip, to aid insertion and removal of the heat reflecting unit.

18. The cooking apparatus according to claim 9, wherein the frame comprises:

a convex member that is convex in relation to the cavity, to reduce a volume of the cavity.

19. The cooking apparatus according to claim 9, wherein:

the cooling fluid is water.

* * * * *

UNITED STATES PATENT AND TRADEMARK OFFICE
CERTIFICATE OF CORRECTION

PATENT NO. : 7,021,200 B2
APPLICATION NO. : 10/681132
DATED : April 4, 2006
INVENTOR(S) : Dae-Sung Han et al.

It is certified that error appears in the above-identified patent and that said Letters Patent is hereby corrected as shown below:

Column 8, line 33, after “that” delete “the” (second occurrence)

Signed and Sealed this

Third Day of April, 2007

JON W. DUDAS
*Director of the United States Patent and Trademark Office*